Patented Sept. 9, 1952

2,610,157

UNITED STATES PATENT OFFICE 2,610,157

POROUS COMPOSITION UTILIZING N-CARBOXYLIC ACID ANHYDRIDES OF AMINO CARBOXYLIC ACIDS

Earl W. Gluesenkamp, Centerville, Ohio, assignor to Monsanto Chemical Company, St. Louis, Mo., a corporation of Delaware No Drawing. Application September 24, 1948, Serial No. 51,109

6 Claims. (Cl. 260—2.5)

This invention relates to new porous, resinous compositions having unusual properties as hereinafter described. More particularly the invention relates to materials containing uniformly dispersed therein small gas filled cells.

Artificial sponge-like compositions, made from natural gums and resins and from synthetic resins and rubbers, are well known to the art. They are usually made from thermoplastic polymeric compounds by compounding the polymers with substances which evolve gases when heated, and then heating the blended compositions to form numerous minute gas cells. Compositions so obtained have unusually low density and a porous cellular structure. It is also conventional to incorporate anti-oxidants, accelerators and vulcanizing agents into synthetic or natural rubber and obtain by heating a fully cured porous composition.

One purpose of this invention is to provide new improved porous plastic compositions. A further purpose is to provide new and more effective agents for generating the gas within the plastic body. A still further purpose of this invention is to provide a means of incorporating, reinforcing linear polymers within the structure of the porous body simultaneously with the production of the gas cells. Other purposes will be evident in the following description of the invention.

It has been found that when rubber or plastic compositions are compounded with N-carboxyaminoacid anhydrides and then heated, the resulting composition becomes porous by reason of the minute gas cells formed by the decomposition of the anhydride. In the blowing operation, the nonvolatile residue of the N-carboxyaminoacid anhydride is polymerized to form a linear polyamide which serves to reinforce the structure and to modify its physical properties.

The polymerization may be a straight thermal reaction, but in the presence of traces of initiators, for example, active hydrogen compounds, such as water, alcohols and amines, polymerization of two units can be effected with the simultaneous regeneration of the initiator which induces further polymerization in the nature of a chain reaction. In either case, the chemical equation involved is

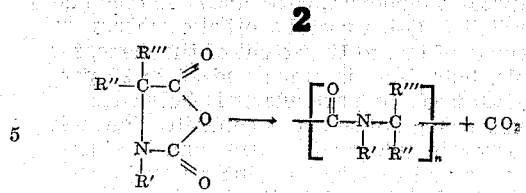

The N-carboxyaminoacid anhydrides may be those derived from the α-aminoacids, the structure of which is described in the preceding equation in which the R', R" and R"' groups may be any alkyl or aryl radicals. Alternatively, the aminoacid anhydrides may be derived from β-amino acids in which case the anhydrides will have the following structural formula:

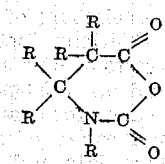

wherein the various R groups may be hydrogen, alkyl or aryl radicals.

Many of the N-carboxyaminoacid anhydrides are known chemical compositions, and others may be prepared from the corresponding amino acids by reacting them with methyl chloroformate to form the N-carbomethoxyamino acid, which is then treated with thionyl chloride to form the corresponding acid chloride, which, upon heating under anhydrous conditions, evolves methyl chloride and cyclizes to form the N-carboxyaminoacid anhydride. The reaction is set forth in the following equations utilizing glycine as an example.

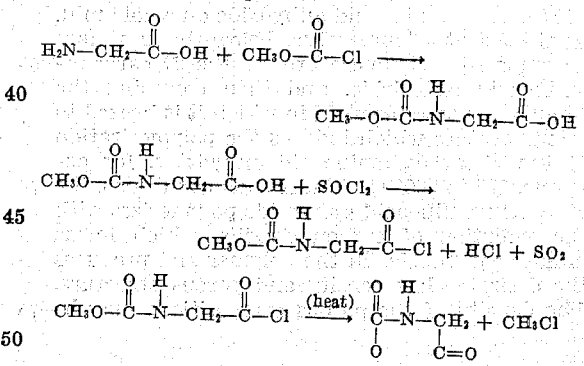

Suitable N-carboxyaminoacid anhydrides are those of N-carboxyleucine, N-carboxyphenylalanine, N-carboxyvaline, N-carboxytryosine and the corresponding anhydrides of other aminoacids, for example, glycine, alanine, valine, leucine, norleucine, isoleucine, isovaline, as well as aminoacids not occurring naturally which may be synthesized by conventional methods. Other useful aminoacids are those containing a radical substituted on the nitrogen atom.

The anhydrides of the N-carboxyaminoacids may be used to generate gas cells in a wide variety of natural and synthetic plastics. Rubber derived from Hevea brasiliensis, guayule, or other natural source may be used, and also synthetic rubber, including the polymers and copolymers of diolefins, such as isoprene, butadiene and chloroprene, particularly the copolymers of butadiene and isoprene with other polymerizable monomers, for example, styrene, acrylonitrile, acrylic and methacrylic esters, and vinyl chloride. The more useful synthetic rubbers are the copolymers of 40 to 90 percent of the diene, particularly butadiene, and from 10 to 60 percent of the other polymerizable monomer, particularly styrene and acrylonitrile. Other useful synthetic rubbers are copolymers of one to 10 percent of the diene, for example, butadiene, isoprene and 90 to 99 percent of an isoolefin, particularly isobutylene.

In processing rubber, it is generally desirable to incorporate vulcanizing agents and the blowing agents, and thereby effecting a cure by continuing the heating after the blowing is completed. Conventional vulcanizing agents, such as sulfur, and accelerators, for example, magnesia, diphenyl guanidine, hexamethylenetetramine and mercaptobenzothiazole, and antioxidants, such as diaminodiphenylamine, may be added.

Another class of compositions which may be processed in accordance with this invention are the polymers and copolymers of vinyl chloride. This class of compositions includes polyvinyl chloride and copolymers of upward of 70 percent of vinyl chloride, and up to 30 percent of other polymerizable monomers, for example, vinyl acetate and other vinyl esters of monocarboxylic acids, methyl methacrylate and other alkyl esters of methacrylic acid, methyl acrylate and other alkyl esters of acrylic acid, methyl maleate and other alkyl esters of maleic acid, methyl fumarate and other alkyl esters of fumaric acid, and vinylidene chloride.

In processing the polymers and copolymers of vinyl chloride, it is frequently desirable to incorporate from five to 40 percent of a suitable plasticizer to render the composition sufficiently fluid at blowing temperatures. Generally, these are more thermoplastic than cured rubber, and, unless heavily plasticized, less resilient.

The new compositions are prepared by milling the plastic with from 2 to 30 percent by weight of N-carboxyaminoacid anhydride on a cold mill, or at least at a temperature below the minimum decomposition temperature of the N-carboxyaminoacid anhydride, and then confining the sample in a suitable mold in which it is heated to a temperature which induces the polymerization of the N-carboxyaminoacid anhydride, for example, 125 to 200° C. Under such conditions, the N-carboxyaminoacid anhydride polymerizes with the evolution of carbon dioxide, which forms minute gas bubbles in the polymer and produces the desirable low density and porous structure. The density of the porous compositions may be changed by varying the proportion of N-carboxyaminoacid, the most useful composition being prepared with from three to 20 percent.

Further details of the invention are set forth with respect to the following specific example.

*Example*

A typical sponge rubber stock having the following formulation was used.

| Composition | Parts by Weight |
|---|---|
| Smoked Sheets | 100 |
| Zinc Oxide | 5 |
| Sulfur | 3 |
| Whiting | 30 |
| Stearic Acid | 3 |
| Mineral Rubber | 10 |
| Paraffin | 2 |
| Oleic Acid | 8.5 |
| Cycline Oil | 23 |
| Flectol H (Condensation product of aniline and acetone) | 1 |
| El-Sixty (Di-(2-benzothiazylthiomethyl) urea) | 0.9 |

A series of samples were milled with 5, 10 and 15 parts by weight, respectively, of glycine N-carboxy anhydride and the resulting compositions heated in a suitable mold to a temperature of 153° C. The heating induced the polymerization of the amino acid anhydride and the evolved carbon dioxide expanded the composition to a porous cellular structure. After twenty minutes of heating, the sample was cured to form tough resilient compositions of unusually desirable porous structure.

The invention is defined by the following claims.

1. Porous compositions prepared by mixing a vulcanizable rubbery polymer of the group consisting of natural rubbers and polymers of diolefinic monomers having four to five carbon atoms, vulcanizing agents, and a compound of the class consisting of the N-carboxylic acid anhydrides of α-amino carboxylic acids and the N-carboxylic acid anhydrides of β-amino carboxylic acids, and heating the mixtures to decompose the N-carboxylic acid anhydride generating polypeptides and gas cells, while simultaneously curing the rubber composition.

2. The method of preparing porous vulcanized rubber compositions which comprises mixing a vulcanizable rubbery polymer of the group consisting of natural rubbers and polymers of diolefinic monomers having four to five carbon atoms, vulcanizing agents, and a compound of the class consisting of the N-carboxylic acid anhydrides of α-amino carboxylic acids and the N-carboxylic acid anhydrides of β-amino carboxylic acids, and heating the mixtures to the vulcanizing temperature.

3. Porous compositions prepared by mixing a vulcanizable rubbery polymer of the group consisting of natural rubbers and polymers of diolefinic monomers having four to five carbon atoms, vulcanizing agents and an N-carboxylic acid anhydride of an α-amino carboxylic acid, and heating the mixture to decompose the N-carboxylic acid anhydrides generating polypeptides and gas cells, while simultaneously curing the rubber composition.

4. The method of preparing porous vulcanized rubber compositions which comprises mixing a vulcanizable rubbery polymer of the group consisting of natural rubbers and polymers of diolefinic monomers having four to five carbon atoms, vulcanizing agents, and an N-carboxylic acid anhydride of an α-amino carboxylic acid and heating the mixture to the vulcanizing temperature.

5. Porous compositions prepared by mixing a vulcanizable rubbery polymer of the group consisting of natural rubbers and polymers of diolefinic monomers having four to five carbon atoms, vulcanizing agents and the N-carboxylic acid anhydride of glycine, and heating the mixture to decompose the N-carboxylic acid anhydride of glycine generating polypeptides and gas cells, while simultaneously curing the rubber composition.

6. The method of preparing porous vulcanized rubber compositions which comprises mixing a vulcanizable rubbery polymer of the group consisting of natural rubbers and polymers of diolefinic monomers having four to five carbon atoms, vulcanizing agents, and the N-carboxylic acid anhydride of glycine and heating the mixture to the vulcanizing temperature.

EARL W. GLUESENKAMP.

REFERENCES CITED

The following references are of record in the file of this patent:

UNITED STATES PATENTS

| Number | Name | Date |
| --- | --- | --- |
| 1,990,925 | Bennett | Feb. 12, 1935 |
| 2,200,473 | Hardman | May 14, 1940 |
| 2,249,686 | Dykstra | July 15, 1941 |
| 2,268,160 | Miles | Dec. 30, 1941 |
| 2,379,413 | Bradley | July 3, 1945 |
| 2,386,995 | Wigal | Oct. 16, 1945 |
| 2,498,792 | Cottet et al. | Feb. 28, 1950 |

FOREIGN PATENTS

| Number | Country | Date |
| --- | --- | --- |
| 553,513 | Great Britain | May 25, 1945 |

OTHER REFERENCES

Woodward et al., Jour. Am. Chem. Soc. pp. 1551, 1552, vol. 69, June 1947.

Leuchs et al. Berichte 41, p. 1721 (1908).